(No Model.) 3 Sheets—Sheet 3.
A. A. WOOD.
MACHINE FOR FILING GIN SAWS.
No. 246,583. Patented Aug. 30, 1881.
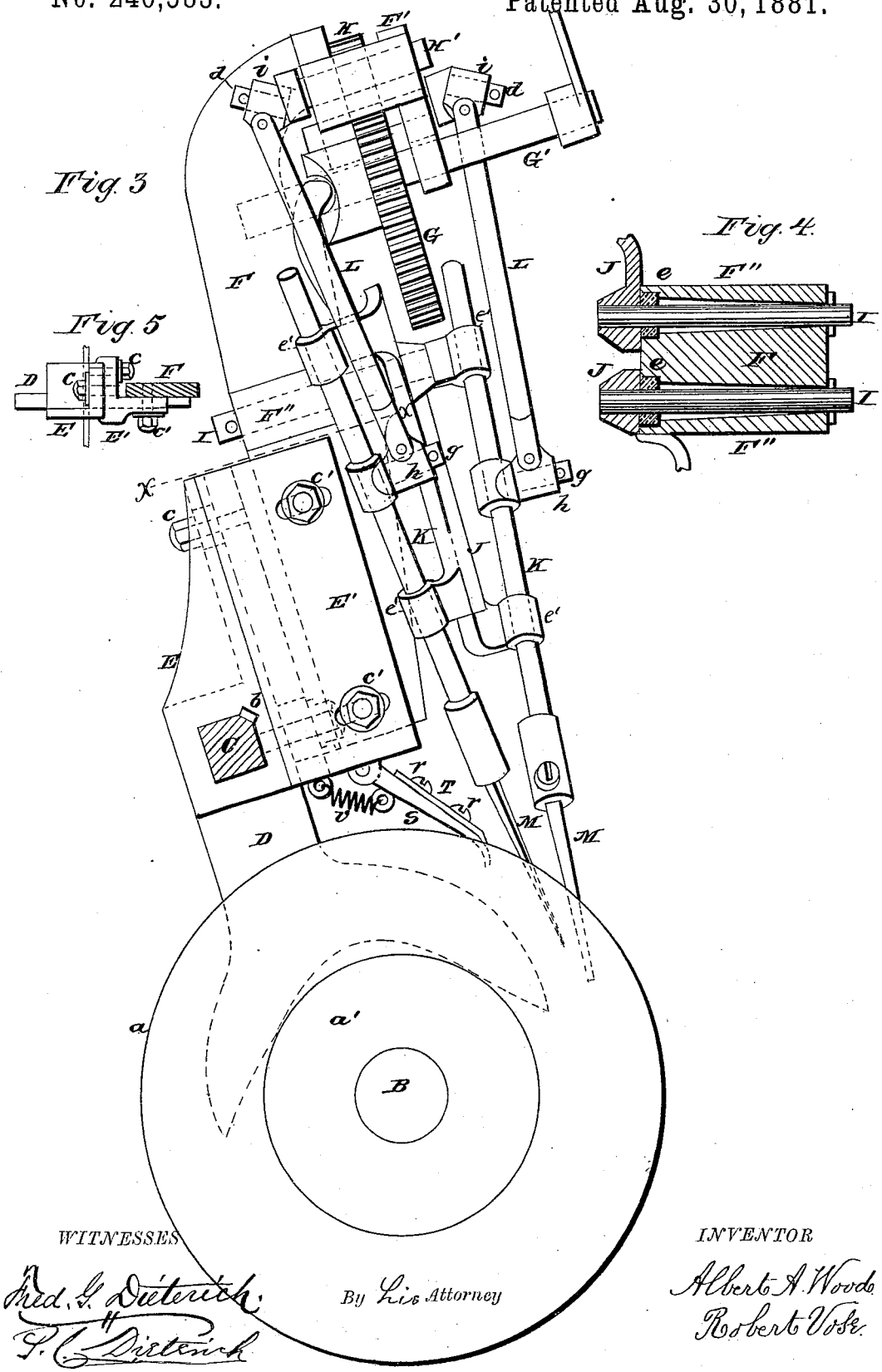
WITNESSES
Fred. G. Dieterich
F. C. Dieterich
By his Attorney
INVENTOR
Albert A. Wood
Robert Vose

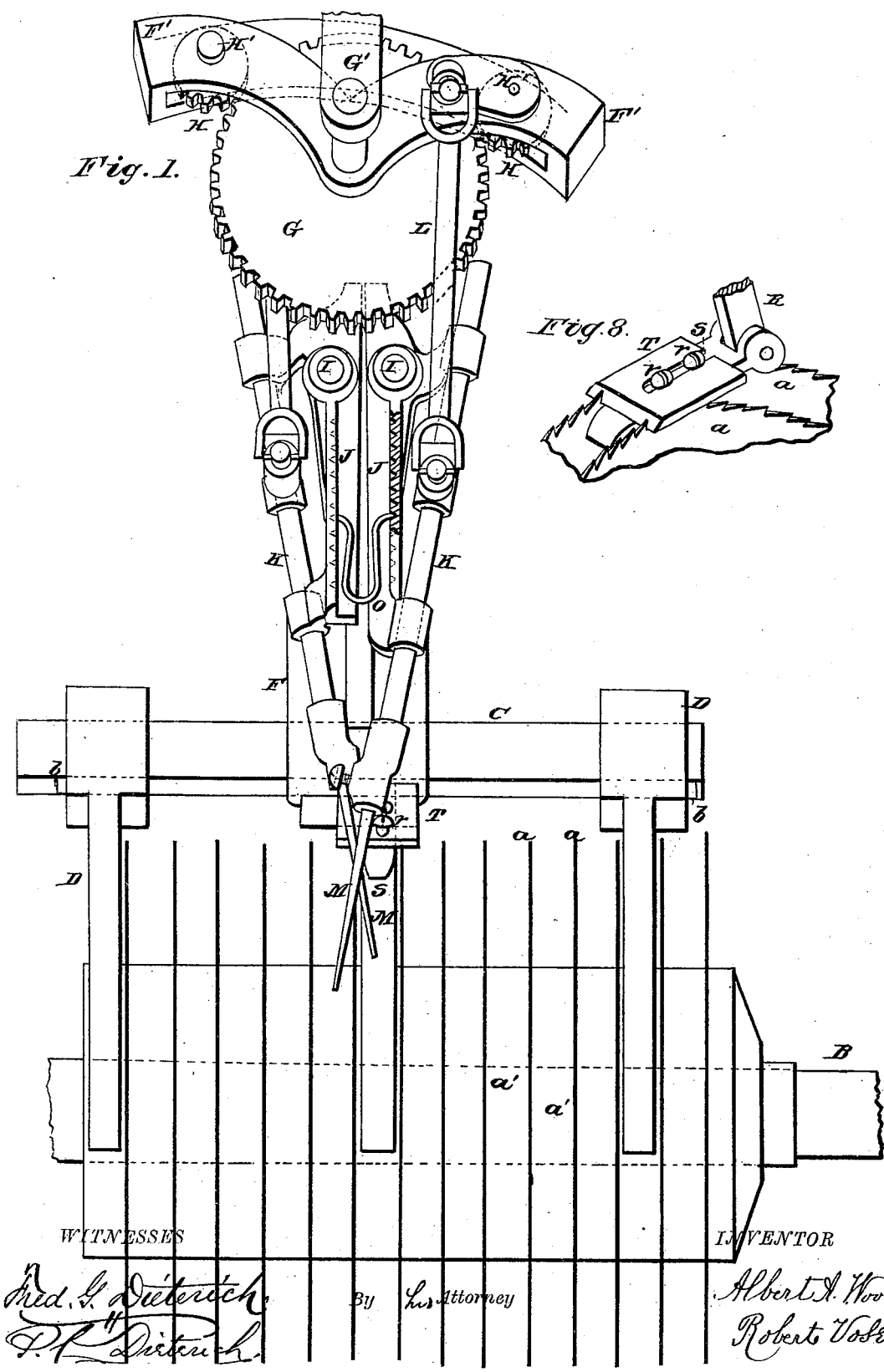

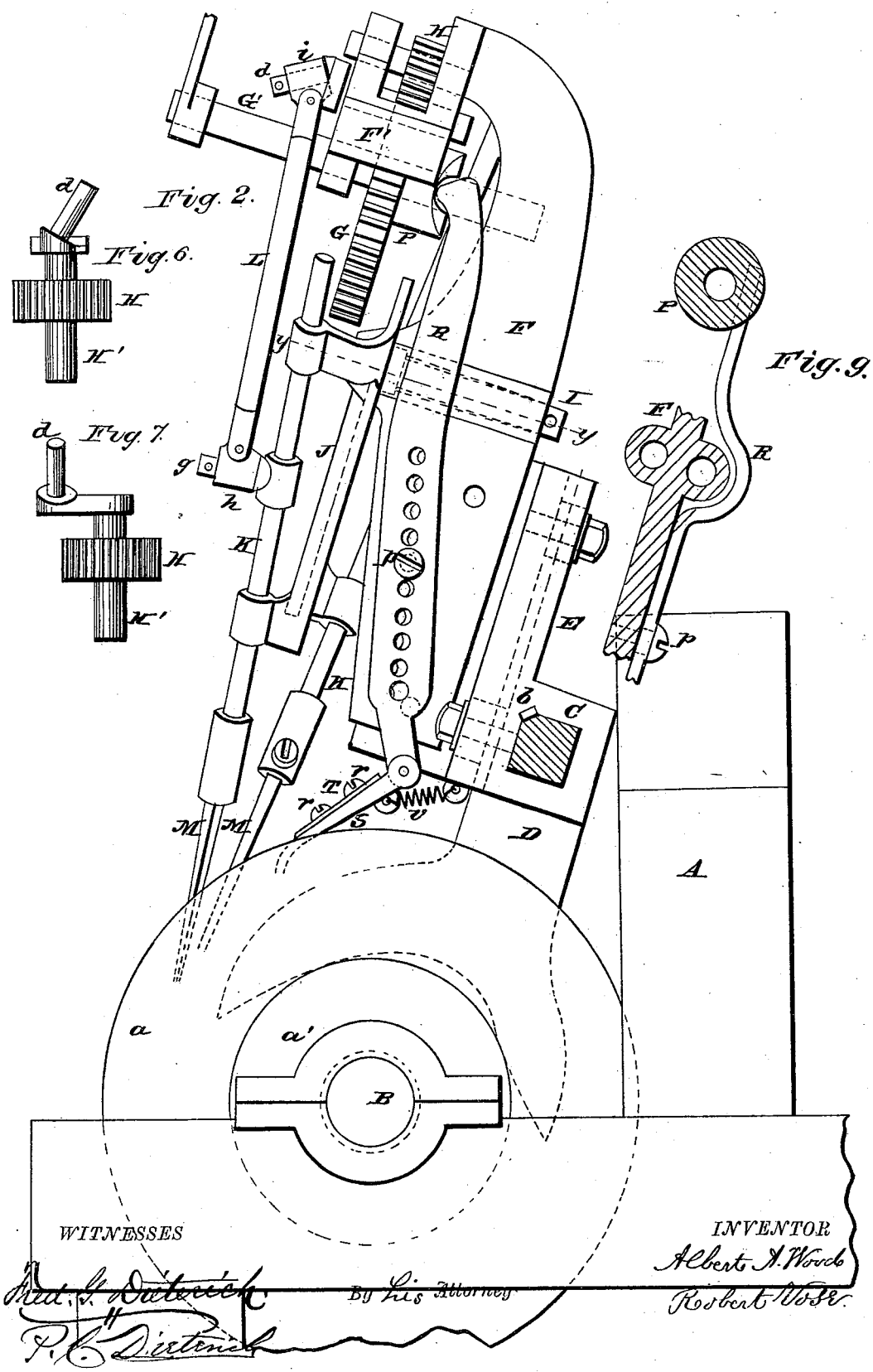

UNITED STATES PATENT OFFICE.

ALBERT A. WOOD, OF ATLANTA, GEORGIA.

MACHINE FOR FILING GIN-SAWS.

SPECIFICATION forming part of Letters Patent No. 246,583, dated August 30, 1881.

Application filed May 16, 1881. (No model.)

*To all whom it may concern:*

Be it known that I, ALBERT A. WOOD, a citizen of the United States of America, residing at Atlanta, in the county of Fulton and State of Georgia, have invented certain new and useful Improvements in Gin-Saw-Filing Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in that class of machines employed in dressing or sharpening the teeth of saws used upon cotton-gins. As the teeth of these saws have an entirely different shape from the teeth of those used for ordinary purposes, being conical or needle-pointed, so that they easily entangle the cotton-fiber, instead of being brought to a flat chisel-shaped cutting-edge, as is the case with those saws used for cutting wood or other similar purposes, it will therefore be apparent that an entirely different construction and operation of the mechanism employed in dressing the teeth of gin-saws will be necessary.

The object of the present invention is therefore to produce a machine which shall dress the teeth of those saws used upon cotton-gins in the form above named, giving them the desired rounded and pointed form which has been found by experience to be so essential to the proper working of the gin, and to accomplish this object without removing the saws from their arbor or the latter from its bearings upon the gin-frame.

The invention therefore consists in certain combinations of mechanism by means of which the sharpening-files are given simultaneously both a reciprocating and a rolling motion, at the same time being held against the saw-tooth by a yielding pressure, and in certain other devices for retaining the machine in position while at work and feeding or moving the saws as the teeth are dressed, all arranged in the manner hereinafter fully described, and then specifically stated in the claims.

In the accompanying drawings, Figure 1 is a front view of the machine in position for operating upon the teeth of a series of gin-saws without removing the arbor upon which they are secured from the gin-frame. Fig. 2 is a side view of the same, showing the machine supported by the saw-arbor and resting against the gin-frame in the ordinary working position, also illustrating the feed mechanism and its mode of operation. Fig. 3 shows the opposite side of the machine from that shown in Fig. 2, illustrating the arrangement of the devices by means of which the machine-frame is adjustably connected with its supporting devices. Fig. 4 is a transverse section through the frame on the line $y\ y$ of Fig. 2, showing the means employed for avoiding rigidity or allowing vibration in the supports of the file-holders. Fig. 5 is a detail view, illustrating the manner of connecting the machine-frame to its supports, the frame being in section. Figs. 6 and 7 show the crank-shafts and oblique cranks by means of which both a reciprocating and rolling motion is given to the file-holders. Fig. 8 is an enlarged detail of the feeding-pawl, showing the manner in which it is arranged to act upon two or more saws at the same time. Fig. 9 shows a plan of the feed-lever, with a section of a portion of the frame on a line with the upper edge of the feed-lever, also a section of the feeding-cam.

In Fig. 2 of the drawings, A represents that portion of the ordinary frame of a cotton-gin which supports the saw-arbor B. This arbor is supplied with a series of saws, $a\ a$, varying in number according to the size of the gin, said saws being separated and held at a proper distance from each other upon the arbor by means of collars $a'\ a'$. As it is not desirable to remove the arbor from the bearings in which it rests and revolves upon the frame A after it has become properly fitted therein, and, further, as such removal is attended with much loss of time and trouble, owing to the other parts of the gin which it is necessary to remove before the saw-arbor could be taken out of its bearings, it became desirable to construct a machine that would dress the teeth of gin-saws without removing the arbor from its bearings upon the gin-frame. This I have accomplished in the machine now to be described.

C represents a bar, preferably of rectangular cross-section, and having a keyway formed at one of its angles, so that when the several parts of the machine which are carried by said bar are brought to the desired location upon it and their securing-keys driven in, the sockets or bearing portions of the parts to be secured will be fully supported upon two sides of the rectangle by the bar, thus causing them to preserve their alignment with relation to each other.

Sliding upon the bar C near its opposite ends, and secured in any position desired upon it by means of keys $b$, driven into a key-seat corresponding to the keyway in the angle of the bar, are the supports D, the forked ends of which pass between the saws $a\ a$ and rest upon the collars $a'\ a'$. It will be seen that these forked supports may be adjusted upon the bar C at such distances from each other as to embrace any desired number of saws, thus giving the machine such a length of base as will insure steadiness and as may be found most efficient in operation.

Secured by keys, in the same manner as the supports D, to the bar C, and between said supports upon the bar, is the bed-piece E, extending upward from the bar, and having attached to it by means of the bolts $c\ c$ a secondary bed or shoe, E′, which is adjustable longitudinally upon the bed E by means of the bolts which secure them together passing through slots in said shoe E′.

Adjustably attached to a vertical member of the shoe by bolts $c'\ c'$, which also pass through slots therein, is the machine-frame F, which is expanded at its upper end into the arms F′ F′, which carry the driving-gear that gives motion to the file-holders. This driving-gear consists of the spur-wheel G, mounted upon the shaft G′, to which may be applied a suitable crank and handle or other means of imparting motion thereto. Engaging with this spur-wheel G are the two pinions H H, each mounted upon a crank-shaft, H′, rotating in suitable bearings in the arms F′ of the frame F. Each crank-shaft H′ is provided with a crank-pin, $d$, placed in an oblique position—that is, the axis of the pin is not parallel with that of the crank-shaft, but at an angle to it—the object of which is to give to the connecting-rods attached to the pins and the parts of the machine operated thereby a rolling movement, in addition to the reciprocating motion ordinarily imparted by a crank.

Upon each side of the frame F is an enlargement, F″, pierced by a conical hole, through which pass the guide-supports I I, as is clearly shown in Fig. 4, each of which is surrounded at the enlarged end of the conical hole by an elastic rubber ring, $e$, which fills the space between the support and the sides of the hole at that point, thus holding the support firmly, but at the same time allowing a certain amount of vibration, which relieves the operating devices of that rigidity so detrimental to the proper working of devices of this class. To illustrate: It is frequently found that the teeth upon old saws which have been frequently dressed by hand are of different sizes, and unless some provision be made to accommodate the machine to this condition, the action of the files upon the teeth would be very unequal.

Secured to the upper end of the supports I I are the guides J J, which carry in suitable bearings, $e'\ e'$, the file-holders K K. It will be observed that the only connection of the guides to the frame F is through the supports I, placed near their upper ends. The guides therefore have a swinging movement on these supports as a center, which allows their opposite ends to approach or recede from each other. The file-holders K K are each provided with a stud, $g$, which receives a bearing, $h$, that is connected by a pivotal joint with one end of each of the connecting-rods L L, the opposite ends of which rods are connected by similar pivotal joints with the crank-pin bearings $i\ i$. The file-holders therefore receive from the revolutions of the oblique cranks not only a reciprocating movement, but a rolling movement, which is found necessary to give the saw-teeth the rounded or "needle" point, as it is technically called, desired. The lower ends of the file-holders are provided with sockets, that receive the files M M, and in which they are secured by set-screws or other suitable means. In order to give these files their proper position in relation to the saw-teeth, the guides J are not placed in the same line, but one of them is placed back of or below the other, so that when their free ends approach each other the files cross, receiving the saw in the angle between them; and in order to give them a proper pressure upon the teeth a spring, $o$, is placed between the free ends of the guides, forcing them apart, and consequently causing the files to press upon the saw between them. In order that this pressure may be varied, the spring $o$ is made adjustable, either by means of a series of conical depressions in the sides of the guides, as shown in Fig. 1 of the drawings, or by other suitable means.

In order to feed or move the saws forward as the dressing of the teeth proceeds, the shaft G′ carries a cam, P, which acts upon one end of the lever R, adjustably fulcrumed upon the bolt $p$ to the frame F. By an inspection of Fig. 2 of the drawings it will be seen that both the frame and lever are pierced by a series of holes for the reception of the fulcrum-bolt, so that by changing the position of the latter the throw of that end of the lever carrying the feed-pawl is increased or diminished to suit the number of teeth to the inch with which the saws to be dressed may be provided.

Attached to the lower end of the lever R by a loose joint, which admits of a slight lateral motion, is the feeding-pawl S, which is provided with a curved extension that passes between two adjacent saws, and, acting as a guide, serves to keep the pawl in place. Adjustably secured to this pawl S by means of the bolts r r is the pawl-plate T, of sufficient width to take hold of the teeth of two or more saws at the same time. By this means the forward movement of the saws will be uninterrupted, as, although it frequently happens that teeth are broken from a saw, they seldom occur at the same point on two adjacent saws. Therefore, as the pawl-plate embraces two or more saws, their forward movement will be continuous. A spring, v, connects the lower end of the feed-lever with the frame of the machine, and serves to keep the opposite end of said lever continuously in contact with the cam P.

This machine has been described as intended for operation solely upon gin-saws which had not been removed from the gin-frame; but it is evident that by providing suitable supports for the machine it will operate equally well upon saws that, with their arbors, have been removed from the gin-frame.

The method of operating the machine when used upon saws the arbors of which remain in the gin-frame is as follows: First raise and remove the breast of the gin. Then set the machine upon the saws in such a position that its back shall rest against the frame-work of the gin while the forked supports are upon the collars between the saws. Then turn the machine, if necessary, so that the contact with the saws will be about in the center between the files. Then observe whether the files bear on the teeth at such an angle as will give them the proper shape. If not, loosen the set-screws c c in the slots under the left-hand file-holder, and, if the files need to cut more on the points of the teeth, raise the lower end of the machine; if more in the throat, depress it. Then turn the crank slowly to see whether the points of the files come off the saws or touch the points of the teeth; if either, loosen the other two set-screws, c' c', and raise or lower the machine, as necessary, to make the files work on the teeth in a proper manner. Then see that all four of the set-screws are set up perfectly tight. Next observe the feeding-pawl, which works on two or more of the saws in order to insure a constant feed in case of broken or irregular teeth. In its backward movement the pawl should come just far enough to feed one tooth. If it should be found that it does not move sufficiently far back to engage another tooth, take out the fulcrum-screw p and put it in a higher hole. If it moves back too far, put it in a lower hole. The machine is preferably set so that the files will work on the last saw at the left end of the arbor, or, if only a part of the saws are to be filed, commencing with the first one from the left, in order that the feeding-pawl may work on those saws which have not been filed, as the action of the pawl is detrimental to the points of those teeth which have been dressed.

Having thus described my invention, I claim as new, and desire to secure by Letters Patent, the following:

1. In a gin-saw-filing machine, the combination, with the bar C, carrying the machine-frame, of the adjustable forked supports D, secured to the bar C, and operating in the manner shown and described.

2. The combination, with the bar C, of the adjustable bed E, shoe E', and frame F, arranged in the manner described to support the operating mechanism of a saw-filing machine, as set forth.

3. The frame F, provided with conical holes, as described, in combination with the guide-supports and elastic rings surrounding said supports within the conical holes to allow vibration of the supports, as set forth.

4. In a saw-filing machine, the combination of the vibrating guide-supports, the swinging guides, and spring o, adjustably secured between the guides in the manner specified.

5. In a saw-filing machine, the frame F, provided with extensions F', in combination with the driving-gear and crank-shafts, carrying oblique cranks, all mounted on said frame in the manner shown and described.

6. As an improvement in saw-filing machines, the oblique cranks, arranged as described, for the purpose of imparting both a rolling and reciprocating movement to the file-holders and files, as set forth.

7. The combination, with the oblique cranks, of the bearings i upon said cranks, the connecting-rods L, bearings h, and file-holders K, arranged, as shown and described, for the purpose of imparting a rolling and reciprocating movement to the files, as set forth.

8. In a saw-filing machine, the feeding mechanism, consisting in the combination of the cam P, lever R, adjustable fulcrum p, and feeding-pawls, arranged to act upon more than one saw at the same time, for the purpose stated.

9. In a feeding-pawl for saw-filing machines, the combination, with the pawl S, of the adjustable pawl-plate T, arranged for operation on the teeth of the saws in the manner described.

In testimony whereof I affix my signature in presence of two witnesses.

ALBERT A. WOOD.

Witnesses:
ROBERT VOSE,
H. B. ZEVELY.